United States Patent
Hisamura et al.

(10) Patent No.: US 10,661,626 B2
(45) Date of Patent: May 26, 2020

(54) ATTACHING STRUCTURE FOR STABILIZER OF UTILITY VEHICLE

(71) Applicant: KAWASAKI JUKOGYO KABUSHIKI KAISHA, Hyogo (JP)

(72) Inventors: Takashi Hisamura, Hyogo (JP); Yusuke Nakashima, Hyogo (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 193 days.

(21) Appl. No.: 15/936,746

(22) Filed: Mar. 27, 2018

(65) Prior Publication Data

US 2019/0299736 A1 Oct. 3, 2019

(51) Int. Cl.
| | |
|---|---|
| *B60G 21/02* | (2006.01) |
| *B60G 7/00* | (2006.01) |
| *B60G 3/14* | (2006.01) |
| *B60G 7/02* | (2006.01) |
| *B60G 21/055* | (2006.01) |
| *B62D 23/00* | (2006.01) |

(52) U.S. Cl.
CPC ............. *B60G 21/026* (2013.01); *B60G 3/14* (2013.01); *B60G 7/001* (2013.01); *B60G 7/02* (2013.01); *B60G 21/0551* (2013.01); *B60G 2204/143* (2013.01); *B60G 2300/07* (2013.01); *B62D 23/005* (2013.01)

(58) Field of Classification Search
CPC .................................................. B60G 21/026; B60G 21/055; B60G 21/0551; B60G 2202/135; B60G 2204/1222; B60G 2204/1224; B60G 2204/143; B60G 2204/4302; B60G 7/001; B60G 7/02; B60G 2300/07; B60G 2300/124; B60G 2300/13; B60G 3/14; B60G 3/20; B60G 3/202; B60G 2200/1442; B62D 23/005; B62D 25/088

See application file for complete search history.

(56) References Cited

U.S. PATENT DOCUMENTS

| | | | | |
|---|---|---|---|---|
| 3,448,994 A | * | 6/1969 | King | B60G 21/055 280/124.106 |
| 4,180,421 A | * | 12/1979 | Joseph | B60G 21/0551 148/319 |
| 5,565,251 A | * | 10/1996 | Tang | B60G 21/055 428/36.8 |

(Continued)

FOREIGN PATENT DOCUMENTS

| | | | | |
|---|---|---|---|---|
| EP | 1533151 A1 | * | 5/2005 | ............. B62D 21/11 |
| FR | 2742382 A1 | * | 6/1997 | ........... B60G 21/055 |
| JP | 60088618 A | * | 5/1985 | ............. B60G 9/003 |

*Primary Examiner* — Laura Freedman

(74) *Attorney, Agent, or Firm* — Wenderoth, Lind & Ponack, L.L.P.

(57) ABSTRACT

An attaching structure for a stabilizer of a utility vehicle includes: a pair of right and left independent suspension devices; the stabilizer which connects the pair of right and left independent suspension devices to each other; and a support member which is raised from a main frame and is configured to support a load from above. A through hole is defined in the support member such that the through hole penetrates the support member in a vehicle width direction, and the stabilizer passes through the through hole and is supported on the support member.

3 Claims, 9 Drawing Sheets

(56) References Cited

U.S. PATENT DOCUMENTS

| | | | | |
|---|---|---|---|---|
| 5,788,264 | A * | 8/1998 | Adkins | B60G 21/0551 |
| | | | | 280/124.106 |
| 6,073,714 | A * | 6/2000 | McHorse | B60G 21/0551 |
| | | | | 180/89.13 |
| 6,439,651 | B1 * | 8/2002 | Johansson | B62D 33/067 |
| | | | | 180/89.12 |
| 7,690,661 | B2 * | 4/2010 | Tsuruta | B60G 3/20 |
| | | | | 180/348 |
| 8,485,303 | B2 * | 7/2013 | Yamamoto | B60G 3/20 |
| | | | | 180/311 |
| 8,746,719 | B2 | 6/2014 | Safranski et al. | |
| 9,186,952 | B2 * | 11/2015 | Yleva | B60G 21/055 |
| 9,718,325 | B2 * | 8/2017 | Moore | B60G 21/055 |
| 9,937,762 | B2 * | 4/2018 | Sunahiro | B60G 3/20 |
| 10,207,555 | B2 * | 2/2019 | Mailhot | B62D 23/005 |
| 10,246,153 | B2 * | 4/2019 | Deckard | B60N 2/90 |
| 2019/0381854 | A1 * | 12/2019 | Hinders | B60G 21/0551 |

* cited by examiner

ATTACHING STRUCTURE FOR STABILIZER OF UTILITY VEHICLE

BACKGROUND OF THE INVENTION

1. Field of the Invention

The present invention relates to an attaching structure for a stabilizer of a utility vehicle.

2. Description of the Related Art

Conventionally, as described in U.S. Pat. No. 8,746,719 specification, a stabilizer of a utility vehicle is supported by a bracket mounted on a vehicle body frame.

SUMMARY OF THE INVENTION

With such a configuration, when a large load is applied to a stabilizer from a suspension device, a case is considered where it is difficult to ensure a sufficient strength for supporting the stabilizer because of the structure of the bracket.

Accordingly, it is an object of the present invention to provide an attaching structure for a stabilizer of a utility vehicle where a strength for supporting the stabilizer can be enhanced.

To achieve the object of the present invention, there is provided an attaching structure for a stabilizer of a utility vehicle which includes:

a pair of right and left independent-suspension-type suspension devices;

a stabilizer which connects both suspension devices to each other; and a support member which is raised from a main frame and supports a load from above, wherein a through hole is formed in the support member such that the through hole penetrates the support member in a vehicle width direction, and the stabilizer passes through the through hole and is supported on the support member.

With such a configuration, the stabilizer is supported on the support member by the through hole formed in the support member. Accordingly, compared to a case where the stabilizer is supported by a bracket mounted on a frame, a supporting strength can be enhanced. Particularly, it is possible to enhance an effect of suppressing vertical movement of the stabilizer.

It is preferable that the attaching structure for a stabilizer of a utility vehicle according to the present invention further include the following configurations.

(1) The support member is disposed below a seat, and supports a load of the seat.

(2) The support member is provided in a form of a pair of right and left support members.

(3) The suspension device includes a trailing arm, and a support bracket which supports a front end of the trailing arm and the support member are disposed at positions where the support bracket and the support member overlap with each other as viewed in a side view of the utility vehicle.

According to the configuration (1), the support member supports the load of the seat and hence, the effect of suppressing the vertical movement of the stabilizer can be further enhanced by the load of the seat and an applied load of an occupant seated on the seat.

According to the configuration (2), the support members are provided in, the form of the pair of right and left support members corresponding to the pair of right and left suspension devices. Accordingly, it is possible to maintain an effect of suppressing movement of the stabilizer while downsizing the structure of support members by shortening a length of the support members in a vehicle width direction.

According to the configuration (3), by providing the support bracket and the support members at positions where the support bracket and the support members overlap with each other as viewed in a side view, a length of the trailing arm can be ensured. As a result, it is possible to alleviate the vertical movement of the wheel more effectively.

As a result, according to the present invention, it is possible to provide the attaching structure for a stabilizer of a utility vehicle where a strength for supporting the stabilizer can be enhanced.

DETAILED DESCRIPTION OF THE PREFERRED EMBODIMENTS

Hereinafter, a utility vehicle having an attaching structure for a stabilizer according to one embodiment of the present invention is described with reference to attached drawings. The utility vehicle is a vehicle for off-road traveling which travels not only on a grass field, a gravel field and a sandy field but also on an unpaved mountain road, a forest road, a muddy road, a rocky area or the like. For the sake of convenience of the description, an advancing direction of the utility vehicle is assumed as a "front side" of the utility vehicle and respective parts, and right and left sides in a vehicle width direction when an occupant riding on the utility vehicle faces forward are assumed as "right and left sides" of the utility vehicle and the respective parts.

[Entire Structure of Vehicle]

Figure 1:
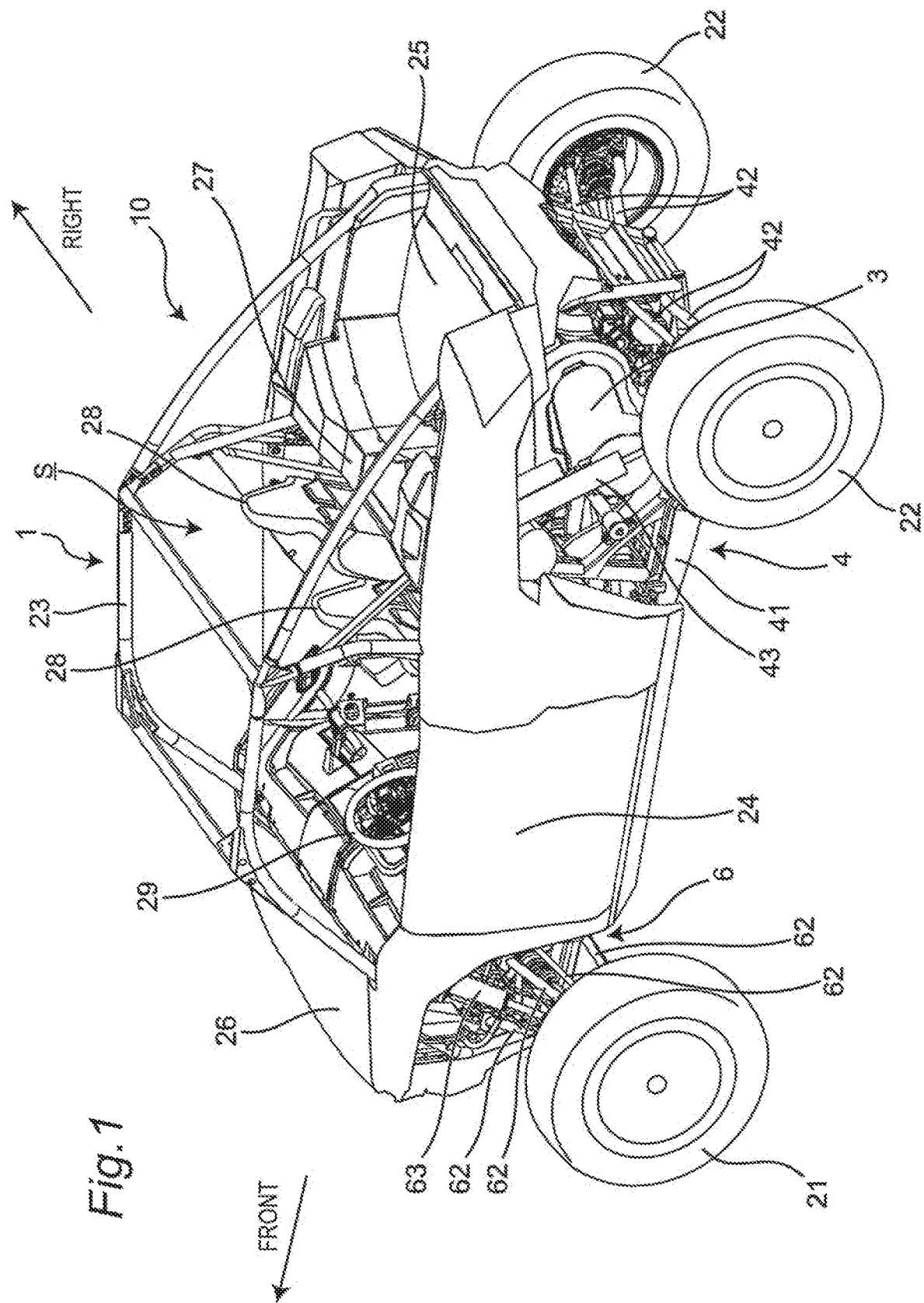
FIG. 1 is a perspective view of a utility vehicle having an attaching structure for a stabilizer according to one embodiment of the present invention.
Figure 2:
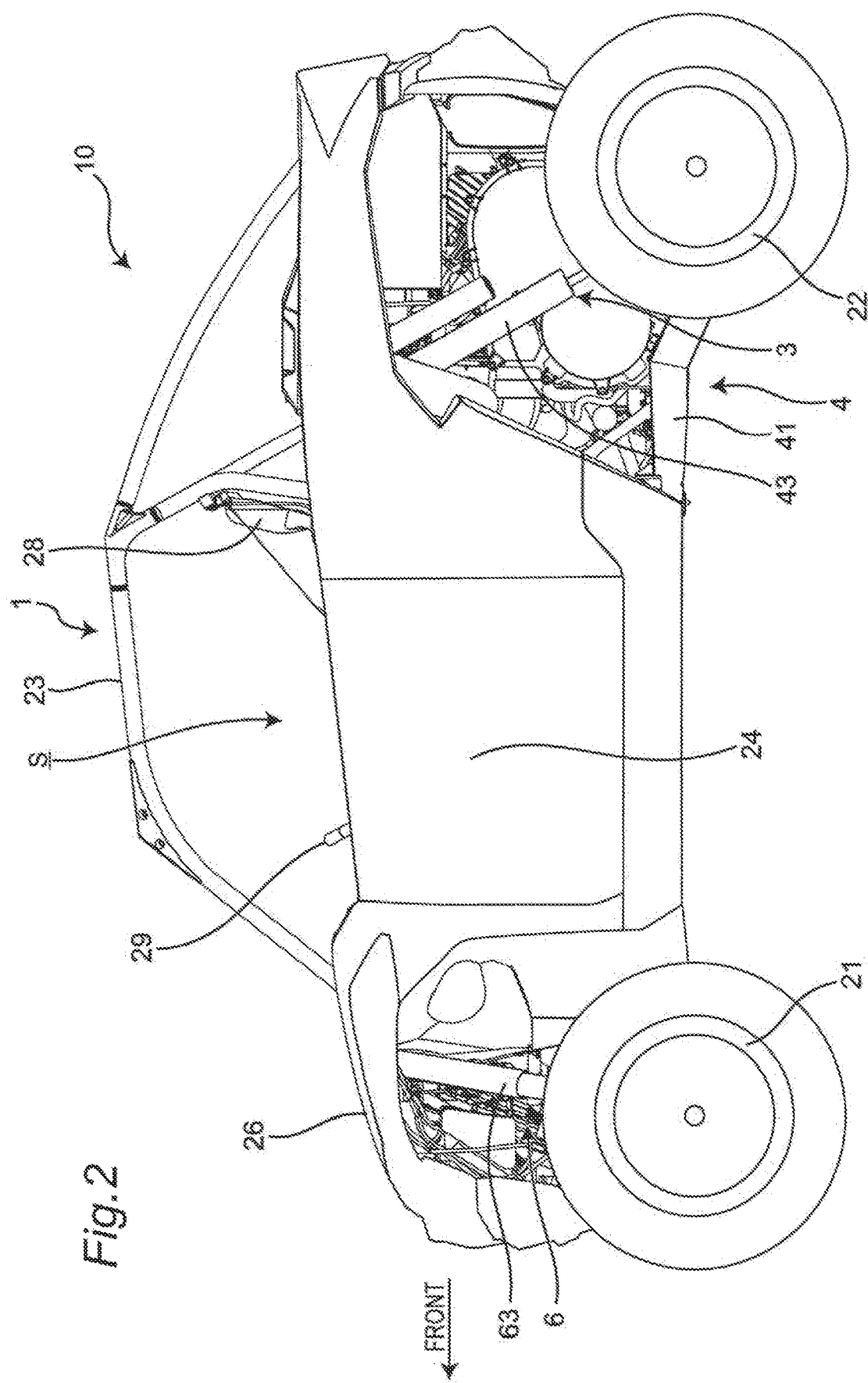
FIG. 2 is a left side view of the utility vehicle shown in FIG. 1.

FIG. 1 is a perspective view of a utility vehicle which has an attaching structure for a stabilizer according to one embodiment of the present invention, and FIG. 2 is a left side view of the utility vehicle shown in FIG. 1.

As shown in FIG. 1 and FIG. 2, a utility vehicle 10 includes a pair of right and left front wheels 21 on a front portion of a vehicle body and a pair of right and left rear wheels 22 on a rear portion of the vehicle body. The utility vehicle 10 includes a riding space (cabin) S between the front wheels 21 and the rear wheels 22. The riding space S is surrounded by a ROPS 23, and a pair of right and left doors 24. The ROPS is an abbreviation of "rollover protective structure", and is a part of a vehicle body frame 1.

A cargo bed 25 is disposed behind the riding space S, and a bonnet 26 is disposed in front of the riding space S. A back panel 27 which partitions the cargo bed 25 and the riding space S from each other is mounted on a front end of the cargo bed 25.

A pair of right and left independent-type seats 28 is disposed in the inside of the riding space S. An operating part such as a steering wheel 29 is disposed in front of the seat 28.

A power unit 3 is disposed below the cargo bed 25. The power unit 3 includes an engine and a transmission. A driving force of the engine is transmitted to the transmission, and the transmission transmits the driving force to the pair of right and left front wheels 21 and the pair of right and left rear wheels 22.

A pair of right and left independent-suspension-type rear-wheel-use suspension devices 4 which supports the pair of right and left rear wheels 22 in a vertically swingable manner is disposed below the cargo bed 25 and on both sides of the power unit 3. Each suspension device 4 includes: a trailing arm 41 which has a front end thereof supported on the vehicle body frame 1 and extends in a longitudinal direction; a plurality of control rods 42 which extend in the vehicle width direction and support a rear end of the trailing arm 41 on the vehicle body frame 1; and a shock absorber 43 which elastically supports the trailing arm 41 on the vehicle body frame 1.

A pair of right and left independent-suspension-type front-wheel-use suspension devices 6 which supports the pair of right and left front wheels 21 in a vertically swingable manner is disposed below the bonnet 26 and on both sides of a front-wheel-use final reduction gear (not shown in the drawing) which transmits a driving force to the front wheels 21. Each suspension device 6 includes: a knuckle 61 which supports a hub of the front wheel 21 in a rotatable manner; a plurality of control rods 62 which extend in the vehicle width direction and support the knuckle 61 on the vehicle body frame 1; and a shock absorber 63 which elastically supports the control rods 62 on the vehicle body frame 1.

[Attaching Structure for Stabilizer]

Figure 3:
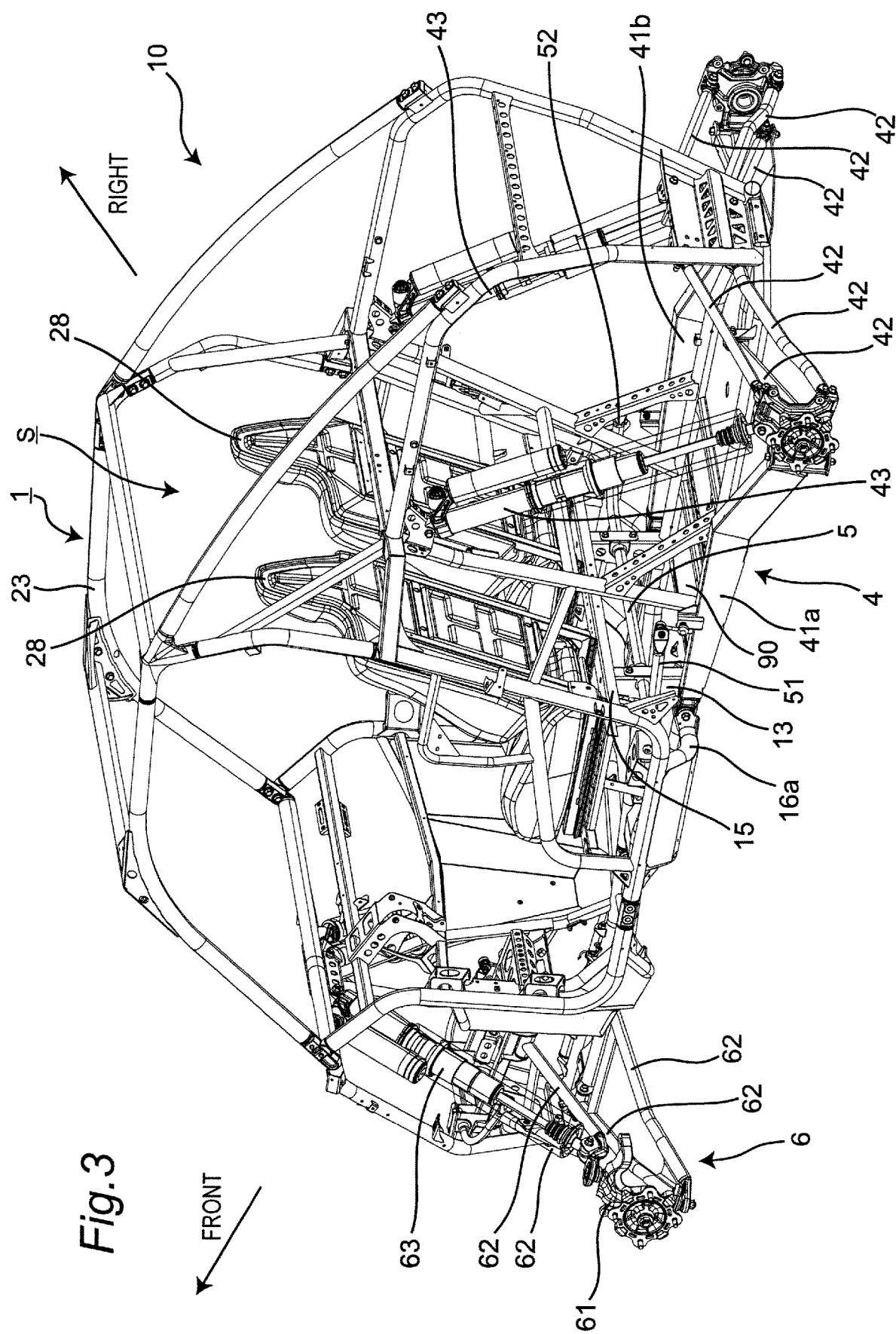
FIG. 3 is a perspective view of the utility vehicle showing an attaching structure for a stabilizer.
Figure 4:
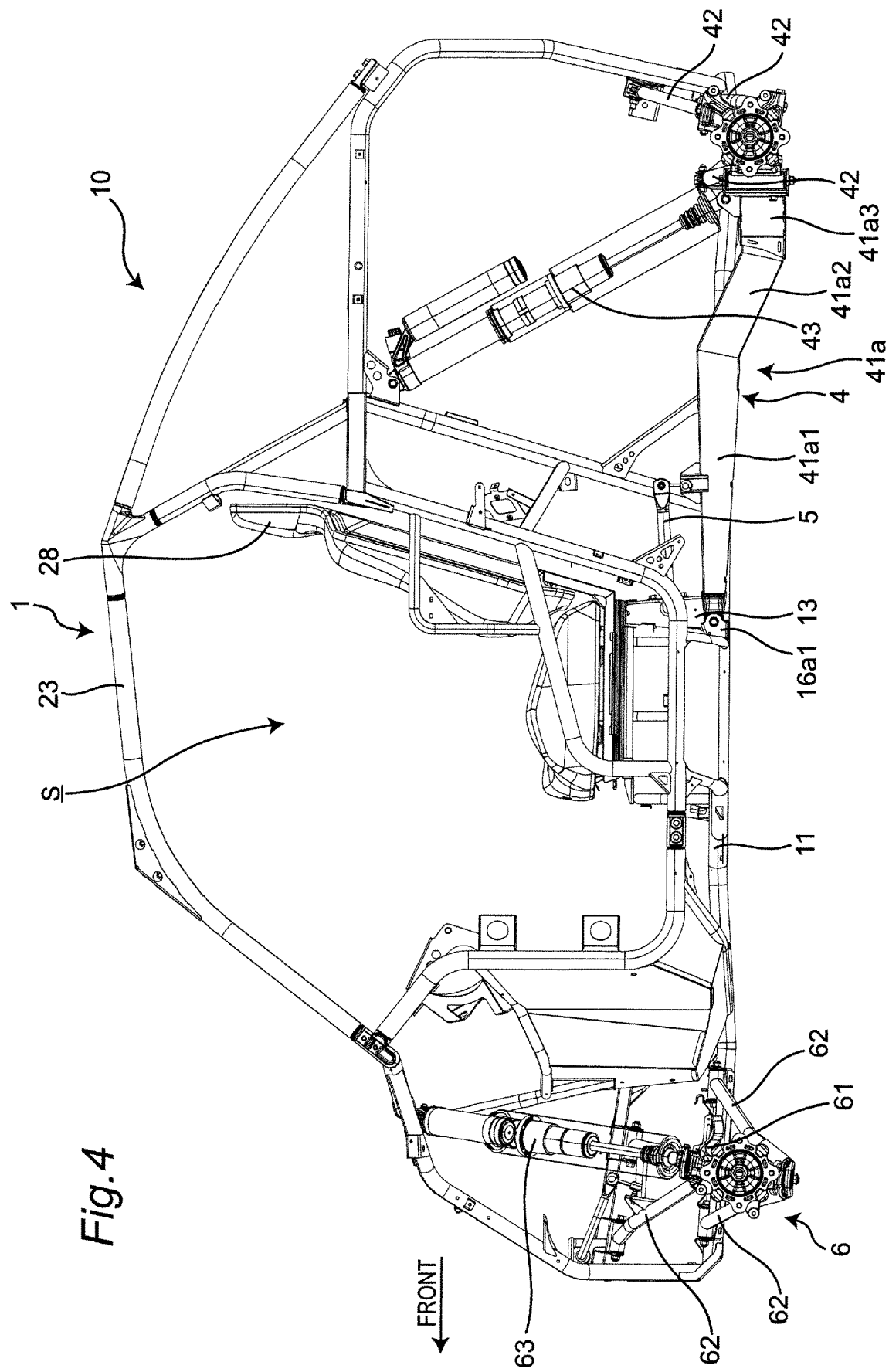
FIG. 4 is a left side view of the utility vehicle shown in FIG. 3.
Figure 5:
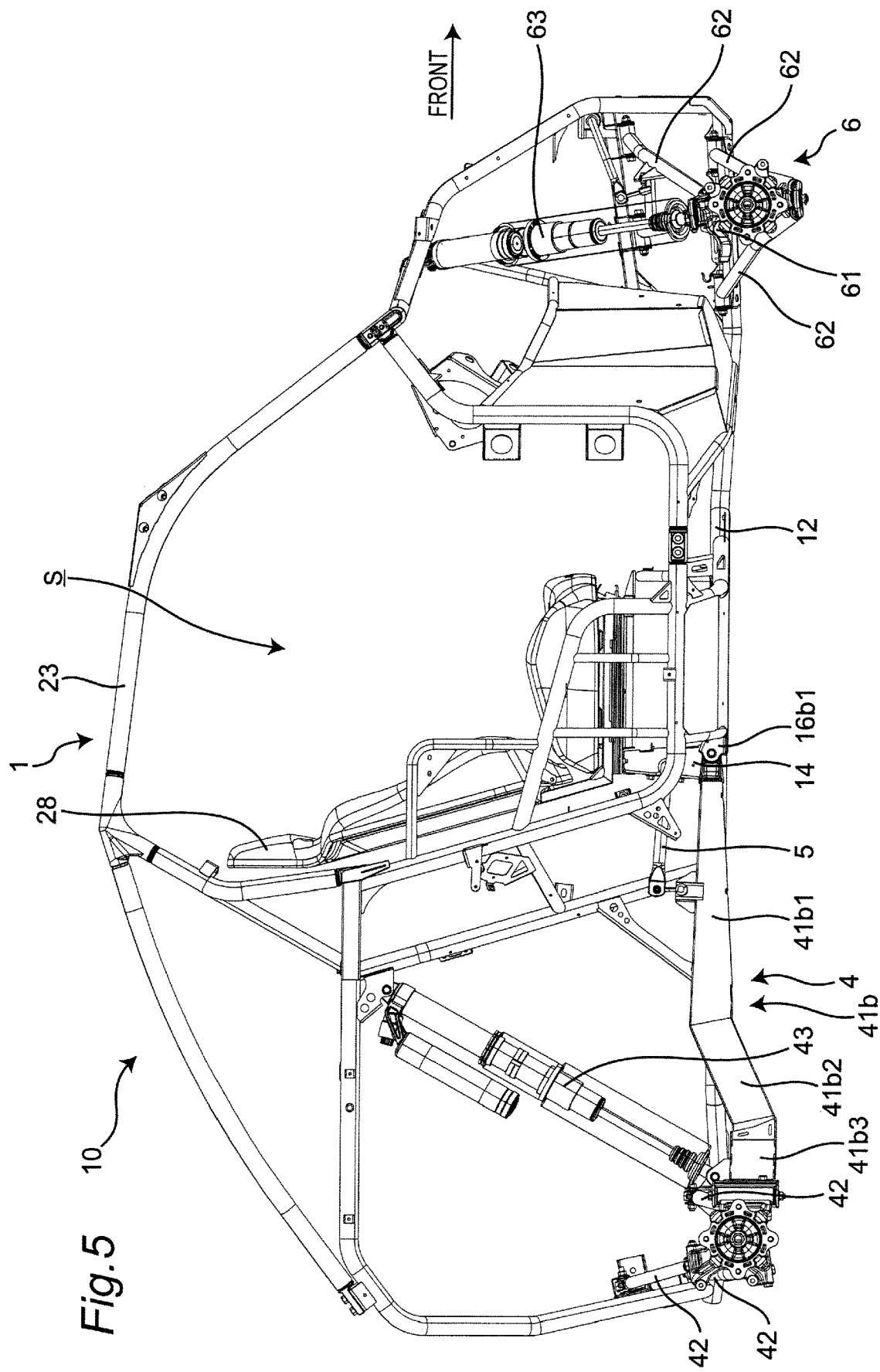
FIG. 5 is a right side view of the utility vehicle shown in FIG. 3.
Figure 6:
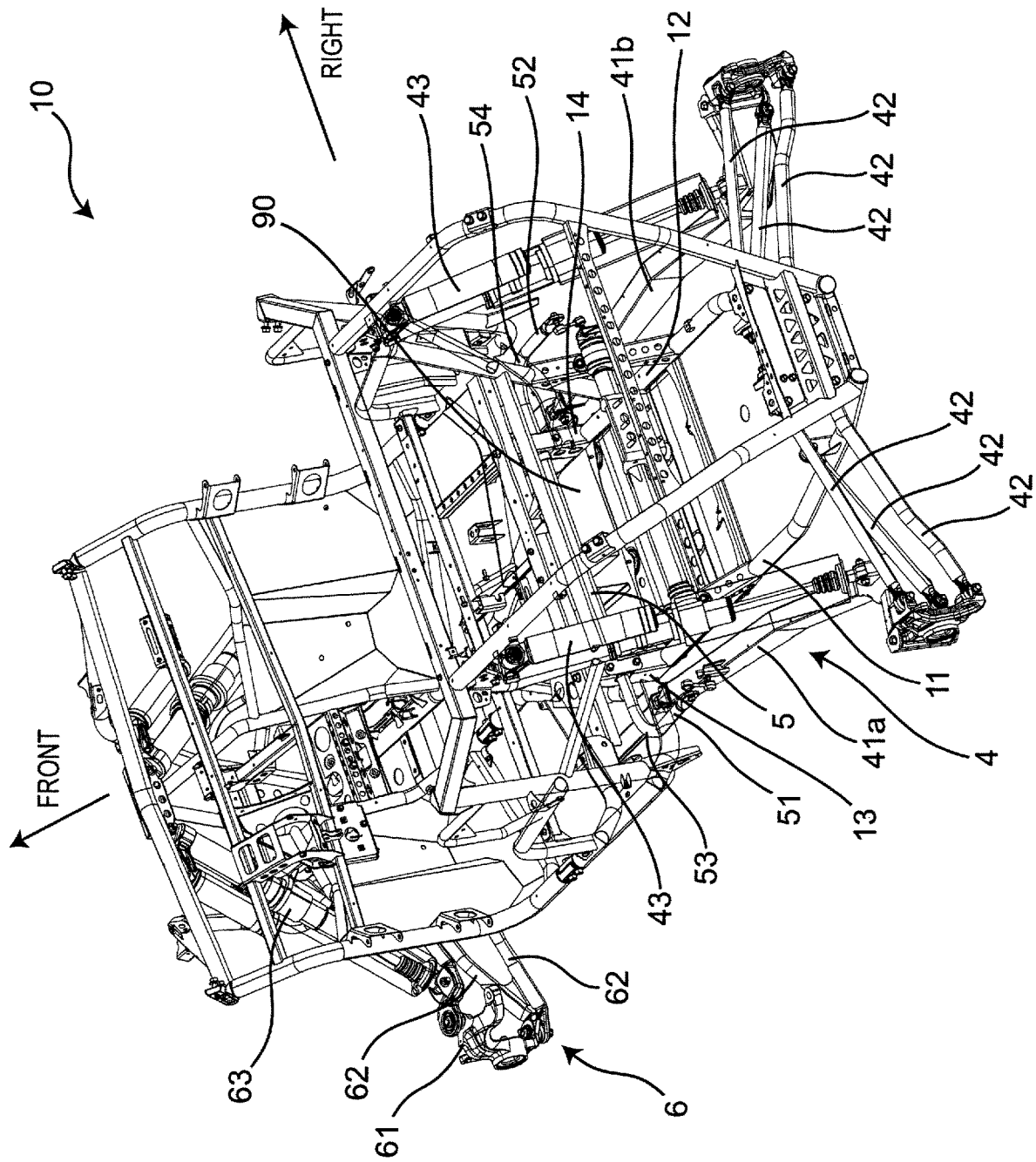
FIG. 6 is a perspective view of the utility vehicle shown in FIG. 3 as viewed from a rear side of the utility vehicle where a Rollover Protective Structure (ROPS) and seats are omitted.
Figure 7:
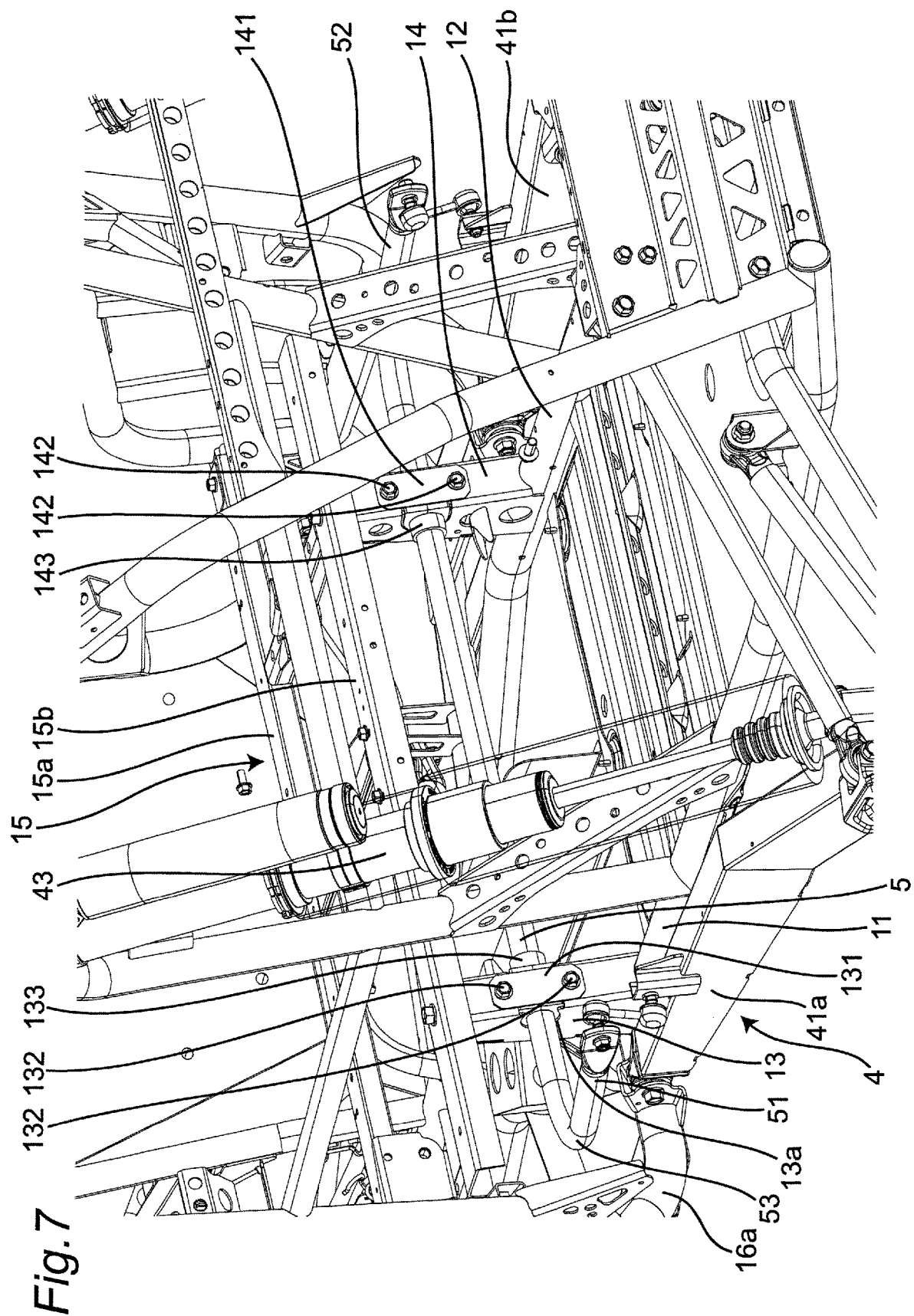
FIG. 7 is an enlarged perspective view of an attaching structure for a stabilizer.

FIG. 3 is a perspective view of the utility vehicle showing the attaching structure for a stabilizer, FIG. 4 is a left side view of the utility vehicle shown in FIG. 3, and FIG. 5 is a right side view of the utility vehicle shown in FIG. 3. FIG. 6 is a perspective view of the utility vehicle shown in FIG. 3 as viewed from a rear side of the utility vehicle where the ROPS 23 and the seats 28 are omitted, and FIG. 7 is an enlarged perspective view of the attaching structure for the stabilizer.

As shown in FIG. 3 to FIG. 7, both suspension devices 4 are connected to each other by a stabilizer 5. One end 51 of the stabilizer 5 supports a left trailing arm 41a, and the other end 52 of the stabilizer 5 supports a right trailing arm 41b. The trailing arm 41a, 41b has: a front portion 41a1, 41b1 which extends in a horizontal direction; a rear portion 41a2, 41b2 which extends downward in an inclined manner toward a rear side from a rear end of the front portion 41a1, 41b1; and a rear end 41a3, 41b3 which extends outward in the vehicle width direction from a rear end of the rear portion 41a2, 41b2 and is connected to a knuckle portion of the rear wheel 22 as viewed in a side view of the utility vehicle. One end 51 of the stabilizer 5 is mounted on an intermediate portion of the front portion 41a1 of the left trailing arm 41a in the longitudinal direction, and the other end 52 of the stabilizer 5 is mounted on an intermediate portion of the front portion 41b1 of the right trailing arm 41b in the longitudinal direction.

The stabilizer 5 extends frontward from one end 51 and extends in the vehicle width direction after being bent rightward at a first bent portion 53, extends rearward after being bent rearward at a second bent portion 54, and reaches the other end 52. That is, the stabilizer 5 has a projecting shape which projects frontwardly.

Figure 8:
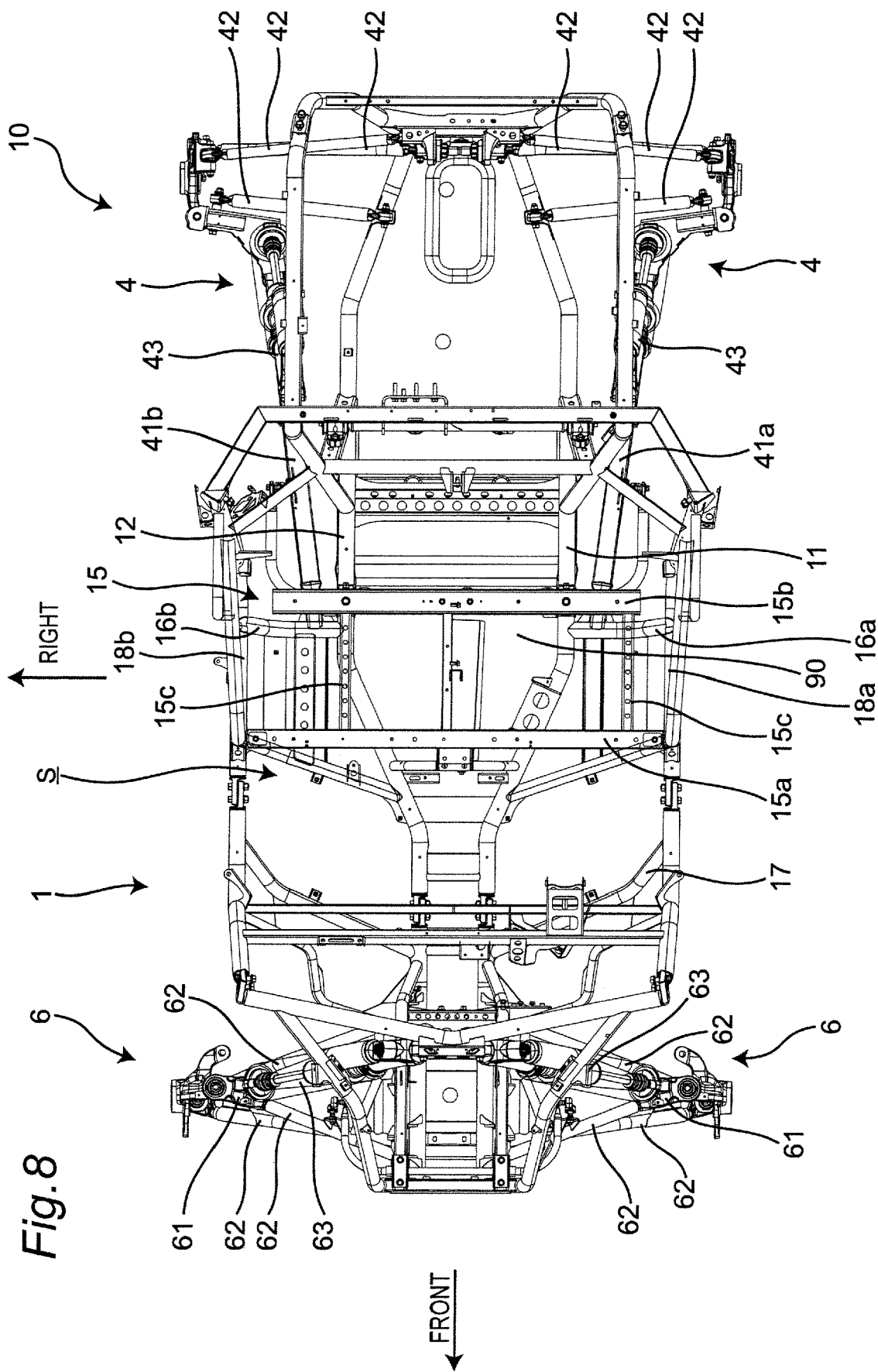
FIG. 8 is a top plan view of the utility vehicle shown in FIG. 6.

FIG. 8 is a top plan view of the utility vehicle shown in FIG. 6. As shown in FIG. 8, the vehicle body frame 1 includes a first bottom frame 11 and a second bottom frame 12 which form a pair of left and right frames respectively on a bottom portion of the vehicle body frame 1. The first bottom frame 11 and the second bottom frame 12 extend substantially horizontally in the longitudinal direction and support a floor plate 90. The first bottom frame 11 and the second bottom frame 12 are main frames which are respectively formed of a circular cylindrical pipe frame.

The first bottom frame 11 and the second bottom frame 12 are positioned at a center portion in the vehicle width direction such that the first bottom frame 11 and the second bottom frame 12 approach closest to each other in the vehicle width direction in a front portion of the riding space S. The first bottom frame 11 and the second bottom frame 12 extend outward in the vehicle width direction in an inclined manner so as to be away from each other in the vehicle width direction as the first bottom frame 11 and the second bottom frame 12 extend rearward from the front portion of the riding space S. Further, the first bottom frame 11 and the second bottom frame 12 extend rearward in parallel to each other in the longitudinal direction below the seats 28 respectively, and extend inward in the vehicle width direction in an inclined manner toward a rear side from a rear portion of the power unit 3 such that the first bottom frame 11 and the second bottom frame 12 approach each other in the vehicle width direction.

A support member 13 which is raised from the first bottom frame 11 and supports a load from above is connected to the first bottom frame 11. On lower surfaces of the seats 28, a rectangular-shaped seat frame 15 having a length in the vehicle width direction greater than a length in the longitudinal direction is mounted.

The seat frame 15 includes: a front frame 15a which extends in the vehicle width direction and is positioned at a front side; a rear frame 15b which extends in the vehicle width direction and is positioned behind the front frame 15a; and two connecting frames 15c which extend in the longitudinal direction and connect the front frame 15a and the rear frame 15b to each other. A length of the rear frame 15b in the vehicle width direction is set shorter than a length of the front frame 15a in the vehicle width direction, and a width of the rear frame 15b in the longitudinal direction is set larger than a width of the front frame 15a in the longitudinal direction. A width of the connecting frame 15c in the vehicle width direction is set shorter than a width of the front frame 15a in the longitudinal direction.

An upper end of the support member 13 is connected to the rear frame 15b of the seat frame 15 and supports a load of the seat 28.

A support member 14 which is raised from the second bottom frame 12 and supports a load from above is connected to the second bottom frame 12. An upper end of the support member 14 is connected to the rear frame 15b of the seat frame 15 and supports a load of the seat 28. The support members 13, 14 are provided as a pair of left and right support members.

Figure 9:
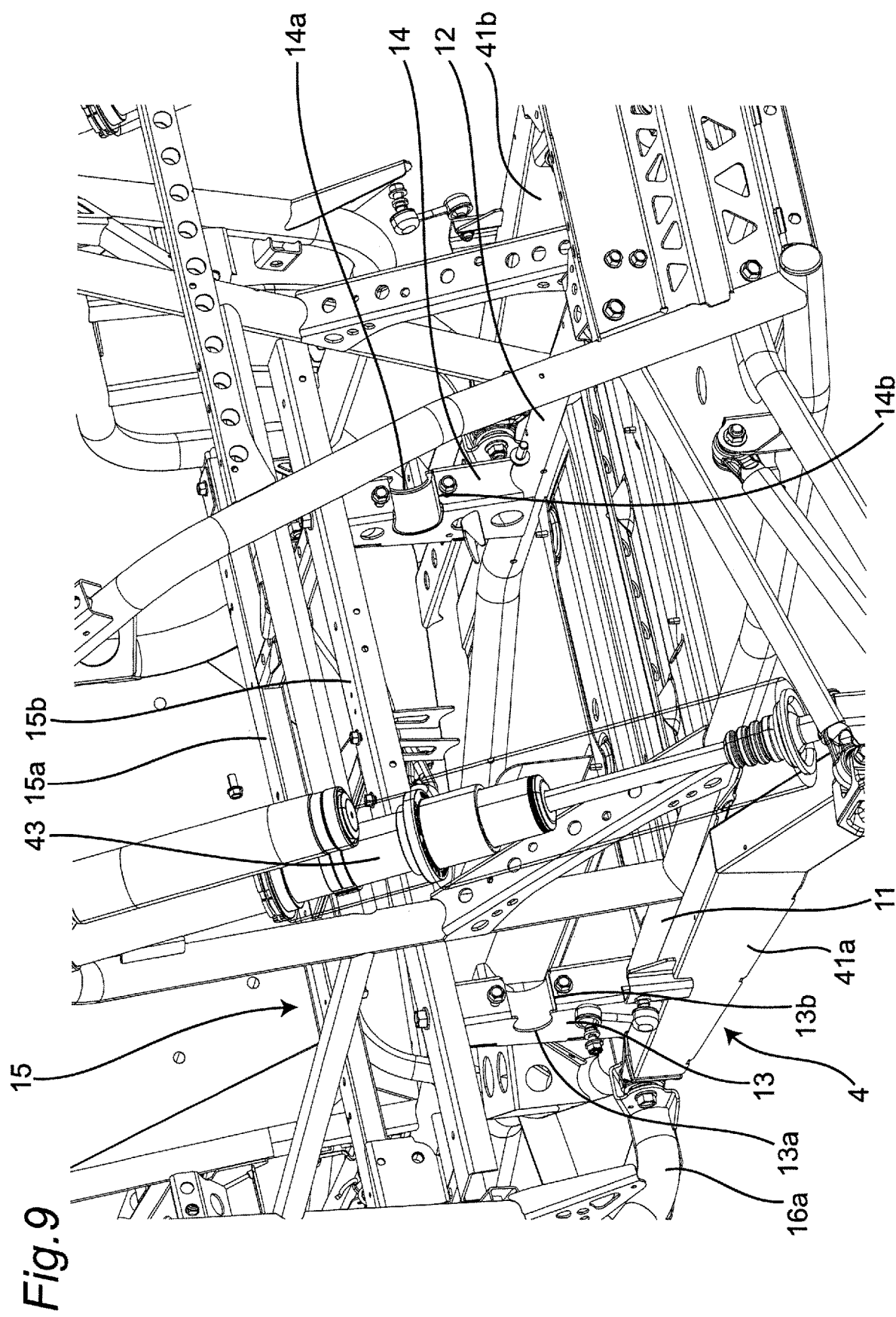
FIG. 9 is a perspective view of the attaching structure for a stabilizer in a state where the stabilizer is removed.

FIG. 9 is a perspective view of the attaching structure for a stabilizer in a state where the stabilizer 5 is removed. As shown in FIG. 6 and FIG. 9, through holes 13a, 14a are formed in vertically intermediate portions of the support members 13, 14 in a penetrating manner in a vehicle width direction. The stabilizer 5 penetrates the through holes 13a, 14a and is supported on the support members 13, 14. The through holes 13a, 14a are formed such that rear portions of the through holes 13a, 14a are notched. After the stabilizer 5 is made to pass through the through holes 13a, 14a, lid members 131, 141 are mounted on rear surfaces of the support members 13, 14 by screws 132, 142 so as to cover the notched portions 13b, 14b respectively. Damper members 133, 143 are disposed between the stabilizer 5 and the through holes 13a, 14a respectively, and the damper members 133, 143 alleviate the transmission of a load from the stabilizer 5 to the support members 13, 14 respectively.

As shown in FIG. 4, FIG. 5 and FIG. 7, a front end of the trailing arm 41a is supported on a support frame 16a which extends in the vehicle width direction, and connects the first bottom frame 11 and a side frame 18a to each other. The side frame 18a is positioned on a left side of the vehicle, and extends in the longitudinal direction of the vehicle. A support bracket (pivot bracket) 16a1 which is mounted on the support frame 16a and pivotally supports the front end of the trailing arm 41a and the support member 13 are disposed at positions where the support bracket 16a1 and the support member 13 overlap with each other as viewed in a side view of the utility vehicle 10.

A front end of the trailing arm 41b is supported on a support frame 16b which extends in the vehicle width direction, and connects the second bottom frame 12 and a side frame 18b to each other. The side frame 18b is positioned on a right side of the vehicle, and extends in the longitudinal direction of the vehicle. A support bracket (pivot bracket) 16b1 which is mounted on the support frame 16b and pivotally supports the front end of the trailing arm 41b and the support member 14 are disposed at positions where the support bracket 16b1 and the support member 14 overlap with each other as viewed in a side view of the utility vehicle 10.

According to the attaching structure for a stabilizer having the configuration, the following advantageous effects can be acquired.

(1) The stabilizer 5 is supported on the support members 13, 14 by the through holes 13a, 14a which are formed in the support members 13, 14 respectively. Accordingly, compared to a case where a stabilizer is supported by a bracket mounted on a frame, a supporting strength can be enhanced. Particularly, it is possible to enhance an effect of suppressing vertical movement of the stabilizer 5.

(2) The support members 13, 14 support the load of the seats 28 by way of the seat frame 15 and hence, the effect of suppressing the vertical movement of the stabilizer 5 can be further enhanced by the load of the seats 28 and an applied load of an occupant seated on the seat 28.

(3) The support members 13, 14 are connected to the rear frame 15b of the seat frame 15. As a result, the rear frame 15b receives the larger load than the load that the front frame 15a and the connecting frames 15c receive. As described above, a length of the rear frame 15b in the vehicle width direction is set shorter than a length of the front frame 15a in the vehicle width direction, and a width of the rear frame 15b in the longitudinal direction is set larger than a width of the front frame 15a in the longitudinal direction. Also, a width of the connecting frame 15c in the vehicle width direction is set shorter than a width of the front frame 15a in the longitudinal direction. As a result, a strength and a rigidity of the rear frame 15b are larger than those of the front frame 15a and the connecting frame 15c. Therefore, the effect of suppressing the vertical movement of the stabilizer 5 can be further enhanced compared to a case where the support members 13, 14 are connected to the front frame 15a or the connecting frames 15c.

(4) By providing the support members 13, 14 in the form of the pair of left and right support members corresponding to the pair of left and right suspension devices 4, lengths of the support members 13, 14 in the vehicle width direction can be shortened thus maintaining the effect of suppressing the movement of the stabilizer 5 while realizing down-sizing of the structure of the support members 13, 14.

(5) By providing the support brackets 16a1, 16b1 and the support members 13, 14 at positions where the support brackets 16a1, 16b1 and the support members 13, 14 overlap with each other, respectively, as viewed in a side view, a length of the trailing arms 41 can be ensured. As a result, it is possible to alleviate the vertical movement of the rear wheels 22 more effectively.

(6) The damper members 133, 143 are disposed between the stabilizer 5 and the through holes 13a, 14a respectively and hence, the damper members 133, 143 can alleviate the transmission of the load from the stabilizer 5 to the support members 13, 14 respectively.

(7) The rear portions of the through holes 13a, 14a of the support members 13, 14 are notched and hence, the stabilizer 5 can be easily mounted on the support members 13, 14 from behind.

In the above embodiment, the stabilizer 5 is supported on the support members 13, 14 which support the load of the seats 28. However, it is sufficient that the stabilizer 5 be supported on a support member which supports the load from above. For example, the stabilizer 5 may be supported on a support member which supports a load of a cargo bed.

In the above embodiment, the support member 13 is raised from the first bottom frame 11, the support member 14 is raised from the second bottom frame 12, the support members 13, 14 are provided in the form of the pair of left and right support members. However, a cross frame which connects the first bottom frame 11 and the second bottom frame 12 to each other and extends in the vehicle width direction may be provided, and a single or a plurality of support members may be provided by forming the support members in a raised manner from the cross frame. In this case, the stabilizer 5 passes through the through holes which are formed in the single or the plurality of support members respectively thus being supported on the single or the plurality of support members.

In the above embodiment, the rear portions of the through holes 13a, 14a formed in the support members 13, 14 are notched respectively. However, the through holes may not be notched, or front portions of the through holes may be notched. When the through holes are not notched, the lid member becomes unnecessary, and when the front portions of the through holes are notched, the lid members are respectively mounted on front surfaces of the support members so as to cover the notched portions.

The various modifications and alterations are also conceivable without departing from the concept and scope of the present invention described in claims.

What is claimed is:

1. An attaching structure for a stabilizer of a utility vehicle, the attaching structure comprising:

a pair of right and left independent suspension devices;
the stabilizer which connects the pair of right and left independent suspension devices to each other; and
a support member which is raised from a main frame, wherein:
a through hole is defined in the support member such that the through hole penetrates the support member in a vehicle width direction,
the stabilizer passes through the through hole and is supported on the support member; and
the support member is below a seat, and is configured to support a load of the seat.

2. The attaching structure according to claim 1, wherein the support member includes a pair of right and left support members.

3. The attaching structure for a stabilizer according to claim 1,
wherein each of the pair of right and left independent suspension devices includes a trailing arm, and a support bracket supporting a front end of the trailing arm, and
wherein the support bracket and the support member overlap with each other as viewed in a side view of the utility vehicle.

\* \* \* \* \*